United States Patent [19]
Abramov et al.

[11] Patent Number: 6,078,709
[45] Date of Patent: *Jun. 20, 2000

[54] METHOD AND APPARATUS FOR MONITORING MULTI-WAVELENGTH OPTICAL SYSTEMS

[75] Inventors: Anatoli A. Abramov, Highland Park, N.J.; Arturo Hale, New York, N.Y.; Joel Leslie Mock, Norcross, Ga.; Thomas A. Strasser, Warren; Ashish Madhukar Vengsarkar, Berkeley Heights, both of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/968,554

[22] Filed: Nov. 12, 1997

[51] Int. Cl.$^7$ .................................................... G02B 6/34
[52] U.S. Cl. .................... 385/37; 385/24; 385/28
[58] Field of Search ............................ 385/24.37, 27–29, 385/31, 15

[56] References Cited

U.S. PATENT DOCUMENTS

| | | | |
|---|---|---|---|
| 4,636,031 | 1/1987 | Schmadel, Jr. et al. | 350/96.19 |
| 4,828,350 | 5/1989 | Kim et al. | 350/96.15 |
| 5,093,876 | 3/1992 | Henry et al. | 385/28 |
| 5,093,884 | 3/1992 | Gidon et al. | 385/132 |
| 5,104,209 | 4/1992 | Hill et al. | 385/27 |
| 5,450,512 | 9/1995 | Asakura | 385/48 |
| 5,459,799 | 10/1995 | Weber | 385/2 |
| 5,469,520 | 11/1995 | Morey et al. | 385/37 |
| 5,579,143 | 11/1996 | Huber | 359/130 |
| 5,703,978 | 12/1997 | DiGiovanni et al. | 385/37 |
| 5,717,798 | 2/1998 | Strasser et al. | 385/37 |
| 5,757,540 | 5/1998 | Judkins et al. | 359/341 |
| 5,828,450 | 10/1998 | Dou et al. | 356/301 |

OTHER PUBLICATIONS

S. G. Grubb and A. J. Stentz, "Fiber Raman Lasers Emit At Many Wavelengths", *Laser Focus World*, Feb. 1996, pp. 127–134.

Neal S. Bergano and Carl R. Davidson, "Long–Period Fiber–Grating–Based Gain Equalizers", *Optic Letters*, Mar. 1996 Optical Society of America, pp. 336–338.

A. M. Vengsarkar, Paul J. Lemaire, Justin B. Judkins, Vikram Bhatia, Turan Erdogan, and John E. Sipe, "Long–Period Fiber Gratings As Band–Rejection Filters", *Journal Of Lightwave Technology*, vol. 14, No. 1, Jan. 1996, pp. 58–65.

K. O. Hill, Y. Fujii, D. C. Johnson and B. S. Kawasaki, "Photosensitivity In Optical Fiber Waveguides: Application To Reflection Filter Fabrication," *Appl. Phys. Lett.* 32 (10), May 15, 1978, pp. 647–649.

B. S. Kawasaki, K.O. Hill, D. C. Johnson, and Y. Fujii, "Narrow–Band Bragg Reflectors In Optical Fibers", *Optics Letters*, vol. 3, No. 2, Aug. 1978, pp. 66–68.

*Primary Examiner*—John D. Lee
*Assistant Examiner*—Victoria D. Hao
*Attorney, Agent, or Firm*—John M. Harman

[57] ABSTRACT

Embodiments of the invention include an optical fiber system and method for separating the different wavelengths of transmitted light transmitted therethrough and for monitoring the respective optical power in the separated spectral components. More specifically, embodiments of the invention scan or modify the physical parameters of in-fiber gratings that couple light between spatially different modes of light within a wavelength-division-multiplexed (WDM) optical fiber system, separate the spatial modes using a mode-discriminating device (MDD) and monitor or detect the separated spectral components using a conventional or other suitable detector. By scanning the in-fiber gratings, the peak wavelength of coupling between two dissimilar modes is modified, thus allowing control of the coupling within the fiber optic system. Scanning the grating is performed, e.g., by changing the temperature or modifying the physical dimensions of the grating. In one embodiment, the system employs a long-period grating that couples light between two co-propagating, spatially different modes. In an alternative embodiment, the system uses a short-period grating that couples light between a forward propagating mode and a spatially dissimilar, backward propagating mode.

27 Claims, 2 Drawing Sheets

METHOD AND APPARATUS FOR MONITORING MULTI-WAVELENGTH OPTICAL SYSTEMS

BACKGROUND OF THE INVENTION

1. Field of the Invention

The invention relates to optical waveguide devices and systems employing wavelength division multiplexing. More particularly, the invention relates to mode discriminating coupling of optical signals within such optical devices and systems.

2. Description of the Related Art

Wavelength-division-multiplexed (WDM) optical fiber systems are known systems characterized by the simultaneous transmission of many different communication channels over different wavelengths within a single optical fiber. For example, communication channels are transmitted over wavelengths typically within the 1530–1565 nanometer (nm) range, and separated by multiples of 100 gigahertz (GHz), i.e., approximately 0.8 nm. Within such systems, the ability to efficiently separate and detect the different wavelengths of light traveling through a single fiber is extremely advantageous. For example, it is desirable to have within WDM optical fiber systems a spectrally-selective device that monitors the different channels and key optical parameters (such as the presence or absence of channels and optical signal-to-noise ratios) at the add/drop nodes or at the optical amplifier locations. Also, for example, within field-installed WDM optical fiber systems, the ability to monitor the optical powers in individual channels with, e.g., a hand-held power measurement device, is extremely useful for obvious reasons.

Existing techniques and devices are known and considered in attempting to address the needs mentioned above. For example, U.S. Pat. No. 5,450,512 issued Sep. 12, 1995 to Asakura discusses a means of detecting the combined optical power of all channels and sending it through free space where it is incident upon a diffractive element such as a bulk grating, which separates the individual channels. These spatially separated channels are then recombined into a fiber end through graded index lenses for power monitoring or processing. The process of bringing light out of the fiber, separating it via a bulk-optic component such as a diffractive grating and then recombining it has several disadvantages. For example, alignment and assembly costs are high and time consuming, the long-term reliability is suspect and insertion losses are prohibitive. In general, it is considered prudent to keep the light within the fiber until it is to be incident upon a detector, such as a detector array. The use of a detector array is disclosed in detail, e.g., in co-pending application Ser. No. 08/741,439 filed Oct. 31, 1996 (now U.S. Pat. No. 5,832,156) and assigned to the assignee of the present invention. The use of a detector array, however, adds additional cost and difficulties such as those associated with accurate alignment and assembly.

Therefore, it is desirable to have available a wavelength separator that uses an in-fiber device and does not invoke the need for additional expensive components such as detector arrays.

SUMMARY OF THE INVENTION

The invention is embodied in an optical fiber system and method for separating the different wavelengths of light transmitted therethrough and for monitoring the respective optical power in the separated spectral components. More specifically, embodiments of the invention scan or modify the physical parameters of in-fiber gratings that couple light between spatially different modes of light within a wavelength-division-multiplexed (WDM) optical fiber system, separate the spatial modes using a mode-discriminating device (MDD) and monitor or detect the separated spectral components using a conventional or other suitable detector. By scanning the in-fiber gratings, the peak wavelength of coupling between two dissimilar modes is modified, thus providing control of the coupling within the fiber optic system. Scanning the grating is performed, e.g., by changing the temperature or modifying the physical dimensions of the grating. In one embodiment, the system employs a long-period grating that couples light between two co-propagating, spatially different modes. In an alternative embodiment, the system uses a short-period grating that couples light between a forward propagating mode and a spatially dissimilar, backward propagating mode.

DETAILED DESCRIPTION

Figure 1:
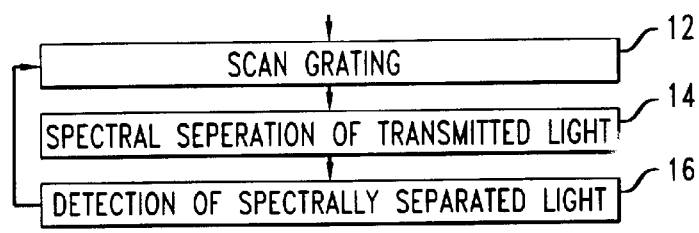
FIG. 1 is a simplified block diagram of a method for monitoring multi-wavelength optical systems according to embodiments of the invention.

In the following description, similar components are referred to by the same reference numeral in order to enhance the understanding of the invention through the description of the drawings.

Also, although specific features, configurations and arrangements are discussed hereinbelow, it should be understood that such is done for illustrative purposes only. A person skilled in the relevant art will recognize that other steps, configurations and arrangements can be used without departing from the spirit and scope of the invention.

Embodiments of the invention are based on the realization that the light or other electromagnetic radiation of interest coupled between spatially dissimilar modes within multi-wavelength optical fiber systems such as wavelength-division-multiplexed (WDM) optical fiber systems have intrinsic properties that are exploited to create in-fiber devices that separate wavelengths and subsequently detect the powers in each of the spectral components. The specific configurations according to embodiments of the invention will be discussed in greater detail hereinbelow.

For purposes of discussion herein, the term "spatially similar" is intended to mean the same or similar regions, e.g., of an optical fiber or other optical energy transmission media of interest. For example, spatially similar modes are those modes of optical energy that occupy similar regions of the optical fiber in which they are propagated. Similarly, "spatially dissimilar" modes are those modes of optical energy that occupy different regions of the optical fiber in which they are propagated.

For example, a fundamental $LP_{01}$ mode occupies the central region of the optical fiber core and has an intensity peak at r=0, where r is the radius of the optical fiber. However, an exemplary higher-order mode, e.g., the $LP_{11}$ mode, appears as two bright spots with an intensity null (or minimum) at r=0.

The coupling of various spatial modes of an optical signal typically is performed by a grating or other suitable coupling device. As is known, gratings are periodic changes in the index of refraction of the photosensitive core of an optical fiber or another optical energy transmission medium. The periodicity of the changes is chosen to bridge the momentum (propagation constant) mismatch between the two modes that the grating is to couple.

Consider three different types of gratings: i) a short-period Bragg grating that couples light from a forward propagating spatial mode of a fiber to a backward propagating, spatially similar mode of the fiber; ii) a short-period Bragg grating that couples light from one forward propagating mode of the fiber to a spatially dissimilar backward propagating mode of the fiber; and iii) a long-period grating that couples light between two co-propagating modes of a fiber. It should be noted that for purposes of discussion herein, the spatial modes are either core modes or cladding modes.

The first type of short-period grating mentioned above includes, e.g., gratings with periodicities $\Lambda$ in the sub-micron range, and are known. For example, see Kawasaki et al., *Optics Letters*; vol. 3, p. 66, Aug. 1978 and K. O. Hill et al., *Appl. Phys. Lett.*, Vol. 1, p. 32, 1978). Typically fiber Bragg gratings with $\Lambda$ =0.55 $\mu$m are wavelength-selective reflectors operating at wavelengths $\lambda \approx 1.55$ $\mu$m and find extensive use in adding and dropping channels in wavelengths-division-multiplexed communication systems.

Also, gratings of this kind have been stretched and heated to change the spectral properties or to add and drop different channels. See, for example, U.S. Pat. No. 4,636,031 issued to Schmad1 and Goodman, U.S. Pat. No. 5,459,799 issued to Weber, U.S. Pat. No. 5,469,520 issued to Morey and Wilson, and U.S. Pat. No. 5,579,143 issued to Huber. Note that in these tunable, in-fiber gratings, light was coupled between similar or identical spatial modes (traveling in opposite directions) and hence the wavelength range over which the gratings could be tuned was restricted.

Typically, stretching a grating leads to a shift in the center wavelength of approximately 1.0 nanometer (nm) for an applied strain of approximately 0.001 (or 1 millistrain). The total shift is limited by the maximum strain the fiber can tolerate mechanically, e.g., approximately 2%. While slightly larger shifts in wavelength are obtained, e.g., by compressing the grating, packaging schemes that use compression are relatively difficult to implement. Similarly, heating the grating leads to a shift of approximately 1 nm for a temperature change of approximately 100° Celsius. It is evident from these numbers that grating wavelengths cannot be tuned more than a few nanometers in practical applications where fiber strength and operating temperatures are constraining factors.

The second type of Bragg grating mentioned above is a reflector that couples light between two spatially dissimilar modes (traveling in opposite directions). Such grating is disclosed in detail, e.g., in co-pending application Serial No. 08/712,697, filed Sep. 12, 1996 (now U.S. Pat. No. 5,717,798) and assigned to the assignee of the present invention. In these reflective devices, light typically is coupled from a fundamental mode of an optical fiber to a higher order spatial mode. This higher order spatial mode could be one that is guided by the core or by the cladding. It should be noted that an important feature of such a grating is that the reflected mode occupies a different spatial region in the fiber than the incident mode.

The third grating type mentioned above, long-period gratings, are in-fiber photo-induced devices that couple light between two dissimilar co-propagating spatial modes in a fiber. Again, these modes are either different modes guided by the core or by the cladding (with the next surrounding region, e.g., air or a coating, acting as the effective cladding for these modes). For example, light is coupled out of the core from a fundamental mode and into the cladding of a fiber on a wavelength selective basis. Previously, these long-period gratings have been used as simple mode-converters (see, e.g., U. S. Pat. No. 5,104,209 issued Apr. 14, 1992 to Hill et al.), as wavelength-dependent loss elements in broadband amplifiers (see, e.g., Vengsarkar et al., *Opt. Lett.* Vol. 21, p. 336, 1996), in high-power fiber lasers, (see, e.g., Grubb and Stentz, *Laser Focus World*, February 1996, p. 127), and as band-rejection filters (see, e.g., Vengsarkar et al., *Journal of Lightwave Technology*, Vol. 14, p. 58, 1996). However, in these cases, only the light within the fiber core is used.

Referring now to FIG. 1, a method 10 according to embodiments of the invention is shown. The first step 12 in the inventive method is to scan the grating or other coupling device. For purposes of discussion in this description, the term "scanning" means changing the peak wavelength of coupling between two dissimilar modes by modifying any of the physical parameters of the grating. Examples of scanning include tuning the grating by either changing the temperature or by straining the fiber using piezoelectric or magnetostrictive techniques.

Gratings operate on the principle that the induced periodic index changes match the phase difference between two spatial modes in a fiber. That is, the periodicity of the perturbations is chosen to bridge the momentum (propagation constant) mismatch between the two modes that the grating is designed to couple. This coupling takes place at a peak wavelength $\lambda_p$, which usually is defined in vacuum.

For example, in a short-period Bragg grating coupling light between a forward propagating fundamental $LP_{01}$ mode and a back-propagating higher-order $LP_{11}$ mode, the phase-matching condition is given by $$\lambda_p = (n_{01} + n_{11})\Lambda, \tag{1}$$

where $\Lambda$ is the period of the grating and typically is less than approximately 1 $\mu$m, and $n_{lm}$ are the effective indices of the $LP_{lm}$ modes. Similarly, a long period grating with period $\Lambda$ will couple light between two co-propagating modes ($LP_{01}$ and $LP_{02}$) that satisfy the condition $$\lambda_p = (n_{01} - n_{02})\Lambda. \tag{2}$$

The only difference between Equations (1) and (2) is the sign (polarity) between the effective indices of the modes In Equation (2), the period $\Lambda$ often is greater than approximately $10\lambda$ and typically has a value in the hundreds of microns. Again, it should be emphasized that the $LP_{lm}$ modes are either core modes or cladding modes.

An important parameter in the above two equations is the effective index of a mode. The effective index of a mode is related to the waveguiding condition that supports the mode in a fiber and is determined by the refractive indices of the central core and all adjacent cladding layers. The coating that surrounds the fiber is considered to be one of the cladding layers and its presence is important when analyzing cladding modes. The refractive indices of the different radial layers of a fiber are material properties and are changed, e.g., by choosing different material compositions. The effective indices are waveguiding properties of the modes and are directly dependent on the physical dimensions (e.g., diameter) of the fiber and the refractive indices of all layers.

From Equations (1) and (2), it is ascertained that the grating performs the spectral selection, therefore, any light incident on the grating will be coupled to another mode only in a selected band of wavelengths centered around $\lambda_p$. Also, the resultant output is in a different spatial mode that occupies a different physical region in the fiber.

Figure 2A:
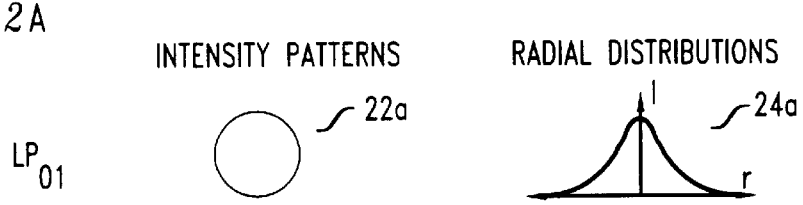
FIGS. 2a–c are schematic diagrams of the intensity patterns and radial distributions of the first three guided modes of a step-index fiber.
Figure 2B:
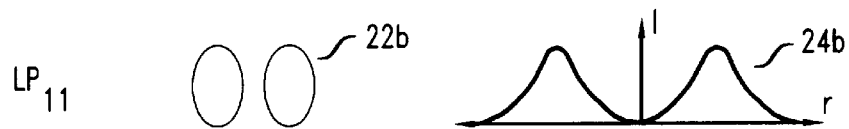
Figure 2C:
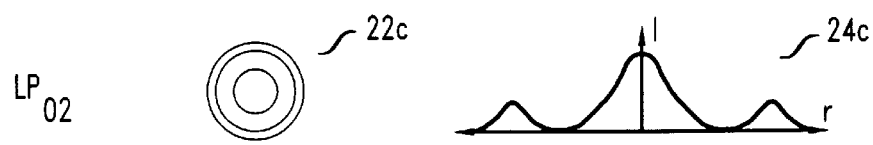

For example, FIGS. 2a–c show the first three guided modes of a step-index fiber, denoted by $LP_{01}$ (FIG. 2a), $LP_{11}$ (FIG. 2b) and $LP_{02}$ (FIG. 2c). The regions of high intensity $22_a$, $22_b$, $22_c$ clearly show how the different modes dominate different positions in the $(\rho, \phi)$ plane of the fiber. FIGS. 2a–c also plot the intensity profiles ($24_a$, $24_b$, $24_c$) as a function of radius. An azimuthally symmetric cladding mode resembles the $LP_{02}$ mode, with several rings in the intensity patterns extending well into the cladding region. In general, for purposes of discussion in this description, the terms "tightly-bound" and "weakly-bound" will be used to define the two dissimilar modes.

A weakly-bound mode is one that is capable of being stripped out of the optical fiber via external perturbations, e.g., bends in the fiber. A tightly-bound mode is one whose energy is significantly confined to the core of the optical fiber, e.g., greater than approximately 60% of the light is carried in the core. A weakly-bound mode, however, has a smaller fraction of its energy propagating in the fiber core (e.g., less than approximately 50%).

As discussed previously herein, scanning the grating controls the peak wavelength of the coupling modes and obtains spectral decomposition. Although examples set forth below discuss temperature scanning in a long-period grating [described by Eq. (2)], it should be appreciated that other scanning or tuning techniques and/or the use of short-period gratings [described by Eq. (1)] are equally applicable.

By differentiating Eq. (2) with respect to temperature (T), we obtain $$\frac{d\lambda_p}{dT} = \Lambda \cdot \left(\frac{\delta n_{01}}{\delta T} - \frac{\delta n_{02}}{\delta T}\right) + (n_{01} - n_{02}) \cdot \left(\frac{\delta \Lambda}{\delta T}\right), \quad (3)$$

where $\delta\Lambda/\delta T$ is governed by the thermal expansion coefficient of the material. It is seen from Equation (3) that for a large change in peak wavelength to be affected by a change in temperature, the optical fiber material needs to be a material such that $\delta n_{02}/\delta T$ is very high. However, it should be noted that a change of $\delta n_{01}/\delta T$ is not desirable because $n_{01}$ essentially is controlled by the core material and the central core material has to satisfy other optical properties such as reactivity to ultraviolet (uv) light (e.g., in order to write the uv-induced grating). Accordingly, a photosensitive silicate glass is best-suited as the material for the core.

While germania, phosphorus and boron co-doping allows for photosensitive operation, the thermal dependence of the refractive indices of these glasses does not vary much. Therefore, the focus shifts to changing the material properties of the regions surrounding the core or almost on the periphery of the core. These peripheral regions contain most of the power of the second mode and $\delta n_{02}/\delta T$ predominantly is controlled by the material properties of these regions. Again, it should be noted that coupling in this manner according to embodiments of the invention is performed between two dissimilar modes (i.e., modes that occupy predominantly different regions of the core). The example shown and discussed hereinbelow illustrates how the use of polymeric coatings such as acrylate/fluoroacrylate polymers in the outermost layers of the optical fiber help accomplish the desired effect.

Referring again to FIG. 1, a second step 14 in method 10 according to embodiments of the invention is to separate the transmitted light according to spectral components, i.e., by wavelength. More specifically, step 14 relates to the separation of the out-coupled mode from the input mode, which typically is the fundamental mode. The separation is performed using, e.g., a mode-discriminating detection device.

Modal separation devices are known. For example, see U.S. Pat. No. 4,828,350, issued May 9, 1989 to Kim et al., which describes one implementation of a modal separation device using a fiber coupler. Since the modes arrive at the detector with different spatial coordinates, several other spatial filters are also useful.

Figure 3:
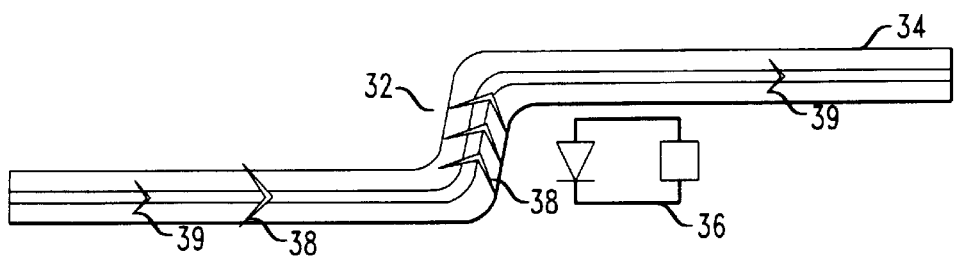
FIG. 3 is a simplified schematic diagram of a mode discriminating device suitable for use in monitors according to embodiments of the invention.

In certain cases where the out-coupled mode is a cladding mode or a weakly guided mode, a simple technique of separation is to bend the fiber or otherwise create a localized bend, thereby out-coupling the light from the side of the fiber. Such embodiment is shown generally in FIG. 3, wherein a bend (shown generally as 32) in an optical fiber 34 and a detector 36 is used to detect a weakly-bound mode (shown generally as 38). A tightly-bound mode (shown generally as 39) remains unaffected by bend 32 and continues to be carried by the core of optical fiber 34.

The next step 16 in method 10 is the detection of the spectrally separated light. Such detection is performed using, e.g., a conventional detector such as a silicon, germanium, or indium-gallium-arsenide (InGaAs) photodiode.

Figure 4:
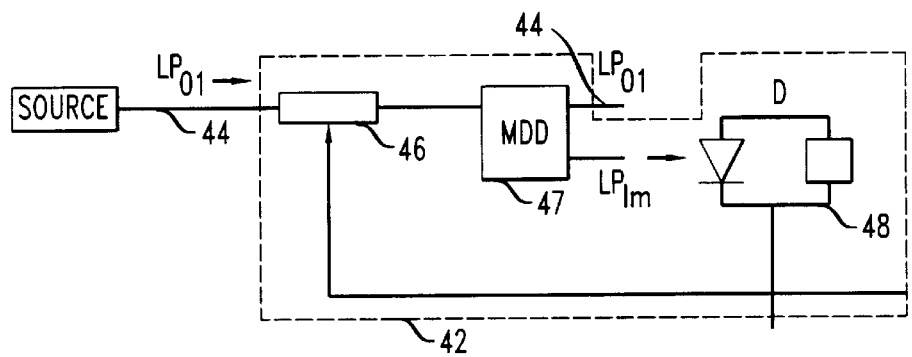
FIG. 4 is a simplified schematic diagram of an in-fiber, long-period grating device for spectral separation and monitoring of optical signals within multi-wavelength optical fiber systems according to embodiments of the invention.
Figure 5:
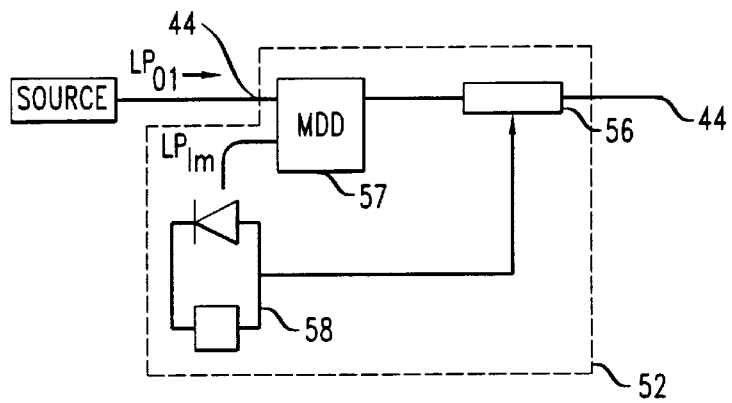
FIG. 5 is a simplified schematic diagram of an in-fiber, short-period grating device for spectral separation and monitoring of optical signals within multi-wavelength optical fiber systems according to embodiments of the invention.

FIGS. 4 and 5 depict simplified schematic diagrams for spectral separating and power monitoring devices according to various embodiments of the invention. FIG. 4 shows an in-fiber, spectral separating and monitoring device 42 in use within an optical transmission system 40. By in-fiber, it is meant that device 42 is not disruptive of the optical fiber 44 used in optical transmission system 40 and the light in fiber 44 remains in a guided mode of fiber 44 without being propagated in free space.

Device 42 incorporates a long-period grating 46, where light is coupled from a $LP_{01}$ mode to a $LP_{02}$ mode in transmission (co-propagating coupling). In addition to long-period grating 46, monitoring device 42 includes a mode-discriminating device (MDD) 47 and a detector 48.

Long-period grating 46 is written, e.g., in a conventional manner, on a selected region of optical fiber 44 in such a way that the co-propagating, spatially different modes are coupled. MDD 47 is operably coupled to optical fiber 44 as shown, wherein the spatially coupled modes are spectrally separated thereby, e.g., in a conventional manner. As mentioned previously herein, mode-discriminating devices are known and, accordingly, MDD 47 is any device suitable for the given application.

Detector 48 is operably coupled to MDD 47 to detect, e.g. the optical power of the optical energy modes coupled by grating 46 and spectrally separated by MDD 47. Detector 48 is, e.g., a silicon. germanium or InGaAs photodiode, depending on the wavelength of detection.

In use, long-period grating 46 is scanned by an externally controlled stimulus, e.g., a change in temperature. As the scan is in progress, the peak wavelength of the coupled light changes, MDD 47 separates light from the desired mode and the power in the out-coupled mode is detected by detector 48. Information about the wavelength and power is extracted, e.g., via a processor that keeps track of the control signal and the detected signal as a function of time. The processor includes, e.g., a de-convolution or other suitable program or capability to extract the necessary information from the optical signal detected by detector 48. Also, in a conventional manner, the knowledge of the out-coupling spectrum from grating 46 and simple correlation techniques are used to extract accurate wavelength information.

FIG. 5 shows an optical transmission system 50 including an in-fiber, spectral separating and monitoring device 52 that incorporates a short-period grating 56. In such arrangement, light is coupled, e.g., from a forward propagating mode to a spatially dissimilar, backward propagating mode in reflection. As shown, the placement of an MDD 57 and a detector 58 differs, e.g., from the arrangement of device 42 in FIG. 4 in that MDD 57 and detector 58 are located at the reflective end of grating 56 instead of the transmissive end.

EXAMPLE

In this example, a specific design of a long-period grating according to an embodiment of the invention that will give a large $d\lambda/dT$ is described. The desired effect is achieved using, e.g., an optical fiber with a polymer coating material having a high negative $\delta n_p/dT$. From Eq. (3), it is seen that maximizing the left-hand side requires an increase in the factor $\Lambda \times \delta n_{02}/\delta n_p \times \delta n_p/\delta T$, where $n_p$ is the refractive index of the polymer material and $\delta n_{02}/\delta n_p$ denotes the dependence of the effective index of the second mode on the polymer refractive index. The term $\delta n_{02}/\delta n_p$ is increased, e.g., by choosing a mode that spreads out significantly into the coating and thus is highly affected by the coating index.

The choice of a suitable polymer material leads to a relatively high $\delta n_p/\delta T$. The change of the polymer refractive index with temperature is given by the following expression (L. Bohn, in "Polymer Handbook," J. Brandrup and E. H. Immergut, Eds., second edition, Wiley, 1975, p. 241):

$$\delta n_p/\delta T = -[(n_p^2+2)(n_p^2-1)/16n_p]\alpha, \quad (4)$$

where $\alpha$ is the volumetric thermal expansion coefficient of the polymer.

Since $\alpha$ is positive for all polymers and $n_p$ is >1, $\delta n_p/\delta T$ is negative. To maximize $|\delta n_p/\delta T|$, a high $n_p$ and a high coefficient of thermal expansion $\alpha$ is needed. However, the refractive index of the polymer, $n_p$, cannot be higher than the index of the glass cladding in order to permit propagation of cladding modes. Polymers with high coefficients of thermal expansion typically are amorphous polymers above the glass transition temperature. Thus, in general, a suitable polymer for this application is, e.g., an amorphous polymer with a glass transition temperature below the device use temperature and with a refractive index close to but lower than that of the glass cladding.

For example, polymers that meet these requirements include fluorinated polymers such as fluoroacrylates and fluoromethacrylates and their copolymers with hydrocarbon-based acrylates (and/or methacrylates), fluorinated urethanes, and silicon-based polymers (e.g., siloxanes). In the case of fluorine-containing polymers, the refractive index is adjusted, e.g., by changing the, relative fluorine content in the polymer molecule. In the case of siloxanes, the refractive index is adjusted, e.g., by changing the ratio of methyl to phenyl groups attached to the siloxane chain.

Obtaining a material with a low glass transition temperature requires a polymer with flexible chains and/or low crosslink density. Siloxane polymers have very flexible chains, and therefore have very low glass transition temperatures (e.g., as low as approximately −120° C.). Fluorine-containing polymers are capable of being formulated to have low glass transition temperatures (e.g., lower than approximately 0° C., and in some cases as low as approximately −100° C.) by selecting flexible monomers (typically monomers with pendant hydrocarbon or fluorocarbon chains containing 5–16 carbon atoms, or monomers with pendant ether groups). Also, polyperfluoroethers have very low glass transition temperatures.

For a practical device operating in the erbium amplifier range of 1530–1560 nm, the $\delta n_p/\delta T$ should be approximately 1 nm/° C. Such need is based on the use of commercially available temperature controllers that easily can scan over 30° Celsius in a relatively short time, e.g., in a few minutes.

For example, consider the specific example of a dispersion shifted fiber with a core containing 10 mole % germania, a mode-field diameter of approximately 8.25 $\mu$m (at a wavelength of approximately 1550 nm), and a cladding diameter of approximately 125 $\mu$m. A long-period grating having a length of approximately 5.5 cm and $\Lambda$=248 $\mu$m was recoated with an acrylate coating with a refractive index of approximately 1.454 (measured at 633 nm and 23° Celsius). The $\delta n_p/\delta T$ of the polymer was estimated to be approximately $-4.7 \times 10^{-4}$ per degree Celsius based on a measured volumetric thermal expansion coefficient of $9 \times 10^{-4}$ per degree Celsius.

The peak wavelength of coupling between the fundamental $LP_{01}$ mode and the $LP_{05}$ cladding mode was monitored as a function of temperature. This temperature dependence is shown as Fiber A in FIG. 6, indicating a $d\lambda/dT$ of approximately 1.32 nm per degree Celsius. This value is approximately 20 times that of standard long-period gratings reported in the literature and it is this property that makes the grating amenable to temperature scanning in a practical device. The light is transmitted through a spatial filter at the output end and thus the cladding mode is extracted. Using a setup such as the setup shown in FIG. 3, spectral information is obtained.

Figure 6:
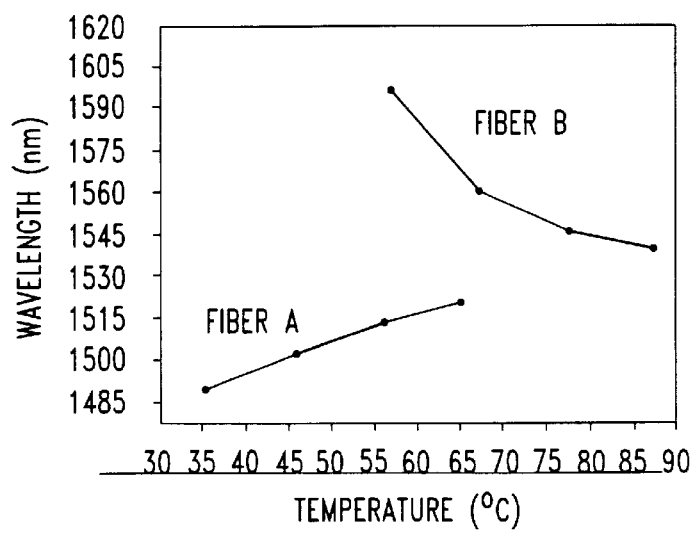
FIG. 6 is a graph of the temperature dependence of the peak wavelength of exemplary fibers according to embodiments of the invention.

The temperature dependence of a fiber grating as determined by another experiment is shown as Fiber B in FIG. 6. In this experiment, a fiber grating of period $\Lambda$=168 $\mu$m written in a fiber with a mode-field diameter of approximately 10.5 $\mu$m and containing approximately 3 mole % germania and a zero-dispersion wavelength of approximately 1.31 $\mu$m was used. The graph indicates a $d\lambda/dT$ of approximately −2.14 nm per degree Celsius.

It will be apparent to those skilled in the art that many changes and substitutions can be made to embodiments of the WDM optical fiber system and method herein described without departing from the spirit and scope of the invention as defined by the appended claims and their full scope of equivalents. For example, it is possible to employ other suitable scanning devices and techniques. Also, although the previously described embodiments use MDD and similar devices for wavelength separation, it is understood that other types of wavelength separation techniques and devices are usable in accordance with the invention. Similarly, other suitable detectors are suitable for us in connection with embodiments of the invention.

What is claimed is:

1. Apparatus for spectrally monitoring the transmission of optical energy in a multi-wavelength optical waveguide system including a source of optical energy, at least one receiver for receiving said optical energy, and an optical energy transmission medium operably coupled to said source and said receiver for transmitting said optical energy therebetween, said apparatus comprising:

a grating operably coupled to said optical energy transmission medium, said grating configured to couple spatially dissimilar propagation modes of said optical energy, said grating capable of being scanned wherein the peak wavelength of the coupled optical energy is modified in relation to said scanning, wherein the absolute value of the temperature dependence of the peak wavelength of said grating ($|d\lambda/dT|$) is greater than approximately 1 nanometer (nm) per 10 degrees Celsius (0.1 nm/° C.);

a mode-discriminating device (MDD) operably coupled to said optical energy transmission medium for spectrally separating the optical energy coupled by said grating; and at least one detector operably connected to said MDD for receiving the spectrally separated optical energy, said detector monitoring the optical power of the spectrally separated optical energy.

2. The apparatus as recited in claim 1, wherein said grating is scanned by changing the temperature of said optical energy transmission medium.

3. The apparatus as recited in claim 2, wherein the temperature of said optical energy transmission medium is changed by depositing a resistive heating element on said optical energy transmission medium at the location of said grating.

4. The apparatus as recited in claim 1, wherein said grating is reduced in diameter and subsequently scanned.

5. The apparatus as recited in claim 1, wherein said grating is scanned by inducing axial strain on said optical energy transmission medium at the location of said grating.

6. The apparatus as recited in claim 1, wherein said grating is a long-period grating configured in such a way that the coupled modes propagate in the same direction within said optical energy transmission medium.

7. The apparatus as recited in claim 1, wherein said grating is a reflective short-period grating configured in such a way that the coupled modes propagate in opposite directions with respect to one another within said optical energy transmission medium.

8. The apparatus as recited in claim 1, wherein said grating further comprises a long-period grating coated with a polymer material in such a way that the absolute value of the temperature dependence of the peak wavelength of said grating ($|d\lambda/dT|$) is greater than approximately 1 nanometer (nm) per degree Celsius.

9. The apparatus as recited in claim 1, wherein said grating further comprises a long-period grating coated with a polymer material selected from the group consisting of fluorinated polymers, fluorinated urethanes and silicon-based polymers.

10. The apparatus as recited in claim 1, wherein said detector is selected from the group consisting of a silicon photodiode, a germanium photodiode, and an indium-gallium-arsenide (InGaAs) photodiode.

11. The apparatus as recited in claim 1, wherein said optical energy transmission medium is an optical fiber.

12. A multi-wavelength optical waveguide system for transmitting optical energy, said system comprising:

a source of optical energy;

at least one receiver for receiving said optical energy;

an optical energy transmission medium operably coupled to said source and said receiver for transmitting said optical energy therebetween; and a spectral monitoring element operably couple to said transmission medium, said spectral monitoring element including a grating operably coupled to said optical energy transmission medium, said grating configured to couple spatially dissimilar propagation modes of said optical energy, said grating capable of being scanned wherein the peak wavelength of the coupled optical energy is modified in relation to said scanning, wherein the absolute value of the temperature dependence of the peak wavelength of said grating ($|d\lambda/dT|$) is greater than approximately 1 nanometer (nm) per 10 degrees Celsius (0.1 nm/° C.);

a mode-discriminating device (MDD) operably coupled to said optical energy transmission medium for spectrally separating the optical energy coupled by said grating; and at least one detector operably connected to said MDD for receiving the spectrally separated optical energy, said detector monitoring the optical power of the spectrally separated optical energy.

13. The system as recited in claim 12, wherein said grating is scanned by changing the temperature of said optical energy transmission medium.

14. The system as recited in claim 13, wherein the temperature of said optical energy transmission medium is changed by depositing a resistive heating element on said optical energy transmission medium at the location of said grating.

15. The system as recited in claim 12, wherein said grating is reduced in diameter at the location of said grating to less than approximately 100 μm and subsequently scanned.

16. The system as recited in claim 12, wherein said grating is scanned by inducing axial strain on said optical energy transmission medium at the location of said grating.

17. The system as recited in claim 12, wherein said grating is a long-period grating configured in such a way that the coupled modes propagate in the same direction within said optical energy transmission medium.

18. The system as recited in claim 12, wherein said grating is a reflective short-period grating configured in such a way that the coupled modes propagate in opposite directions with respect to one another within said optical energy transmission medium.

19. The system as recited in claim 12, wherein said detector is selected from the group consisting of a silicon photodiode, a germanium photodiode, and an indium-gallium-arsenide (InGaAs) photodiode.

20. The system as recited in claim 12, wherein said optical energy transmission medium is an optical fiber.

21. The system as recited in claim 13, wherein said grating further comprises a long-period grating coated with a polymer material in such a way that the absolute value of the temperature dependence of the peak wavelength of said grating ($|d\lambda/dT|$) is greater than approximately 1 nm/° Celsius.

22. A method for spectrally monitoring the transmission of optical energy within a wavelength-division-multiplexed (WDM) optical waveguide system, said system including a source of optical energy, a receiver of optical energy and an optical energy transmission medium operably coupled between said source and said receiver, said optical energy transmission medium having an in-fiber grating that couples spatially dissimilar propagation modes of said optical energy, said method comprising the steps of:

scanning said grating to modify the peak wavelength of the spatially dissimilar propagation modes of the coupled optical energy of said optical energy, wherein peak wavelength of said grating is modified at a rate greater than approximately 1 nanometer (nm) per 10 degrees Celsius (0.1 nm/° C.);

spectrally separating the spatially dissimilar propagation modes of the optical energy coupled by said grating using a mode-discriminating device (MDD); and detecting the spectrally separated optical energy.

23. The method as recited in claim 22, wherein said scanning step scanning further comprises changing the temperature of said grating.

24. The method as recited in claim 23, wherein said scanning step further comprises changing the temperature of said grating by a resistive heating element deposited on said optical energy transmission medium at the location of said grating.

25. The method as recited in claim 22, wherein scanning step further comprises inducing strain on said optical energy transmission medium at the location of said grating.

26. The method as recited in claim 22, wherein said grating is a long-period grating configured in such a way that the coupled modes propagate in the same direction within said optical energy transmission medium.

27. The method as recited in claim 22, wherein said grating is a reflective short-period grating configured in such a way that the coupled modes propagate in opposite directions with respect to one another within said optical energy transmission medium.

* * * * *